US006356270B2

(12) United States Patent
Pentkovski et al.

(10) Patent No.: US 6,356,270 B2
(45) Date of Patent: *Mar. 12, 2002

(54) EFFICIENT UTILIZATION OF WRITE-COMBINING BUFFERS

(75) Inventors: Vladimir Pentkovski, Folsom; Hsien-Cheng E. Hsieh, Gold River; Hsien-Hsin Lee, El Dorado Hills; Subramaniam Maiyuran, Fair Oaks, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,231

(22) Filed: Mar. 31, 1998

(51) Int. Cl.[7] .................................................. G06T 1/60
(52) U.S. Cl. ......................... 345/530; 345/557; 711/118
(58) Field of Search ......................... 345/501, 507–509, 345/513, 522, 427, 419, 557, 530, 536, 560; 711/118, 119, 126

(56) References Cited

U.S. PATENT DOCUMENTS

| | | | | |
|---|---|---|---|---|
| 5,561,780 A | * | 10/1996 | Glew et al. | 711/126 |
| 5,630,075 A | * | 5/1997 | Joshi et al. | 711/100 |
| 5,680,572 A | * | 10/1997 | Akkary et al. | 711/126 |
| 5,751,996 A | * | 5/1998 | Glew et al. | 711/145 |
| 5,835,972 A | * | 11/1998 | Choate | 711/220 |
| 5,977,997 A | * | 11/1999 | Vainsencher | 345/519 |

OTHER PUBLICATIONS

Visual Instruction Set (VIS™) User's Guide, Sun Microsystems, Version 1.1, Mar. 1997.
AMD–3D Technology Manula, AMD, Publication No. 21928, Issued Date: Feb. 1998.
The UltraSPARC Processor—Technology White Paper, The UltraSPARC Architecture, Sun Microsystems, Jul. 17, 1997, pp. 1–19.
21164 Alpha Microprocessor Data Sheet, Samsun Electronics, 1997, pp. iii–vii, 1, 49–51, 55–59 and 63–77.
TM1000 Data Book, Philips Semiconductors, by Gert Slavenburg, Mar. 24, 1997, pp. 2–1 through 4–10.

* cited by examiner

Primary Examiner—Kee M. Tung
(74) Attorney, Agent, or Firm—Blakely, Sokoloff, Taylor & Zafman LLP (57) ABSTRACT

The present invention discloses a method and apparatus method for efficient utilization of write-combining buffers for a sequence of non-temporal stores to scattered locations. The method comprises: converting the sequence of non-temporal stores to stores to intermediate buffers; and grouping the stores to intermediate buffers into consecutive non-temporal stores. The consecutive non-temporal stores correspond to adjacent memory locations in the write-combining buffers.

17 Claims, 9 Drawing Sheets

EFFICIENT UTILIZATION OF WRITE-COMBINING BUFFERS

BACKGROUND OF THE INVENTION

1. Field of the Invention

This invention relates in general to microprocessor systems, and more particularly, to the efficient utilization of the write-combining buffers through the implementation of intermediate buffers.

2. Description of Related Art

The use of a cache memory with a processor facilitates the reduction of memory access time. The fundamental idea of cache organization is that by keeping the most frequently accessed instructions and data in the fast cache memory, the average memory access time will approach the access time of the cache. To achieve the maximum possible speed of operation, typical processors implement a cache hierarchy, that is, different levels of cache memory. The different levels of cache correspond to different distances from the processor core. The closer the cache is to the processor, the faster the data access. However, the faster the data access, the more costly it is to store data. As a result, the closer the cache level, the faster and smaller the cache.

The performance of cache memory is frequently measured in terms of its hit ratio. When the processor refers to memory and finds the word in cache, it is said to produce a hit. If the word is not found in cache, then it is in storage device and it counts as a miss. If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

When a processor accesses memory for transfer of data between the processor and the memory, that access can be allocated to the various levels of cache, or not allocated to cache memory at all, according to the memory type set up by the system or the locality hint associated with the instruction. Certain instructions are used infrequently. For example, some specific prefetch instructions can preload data which the processor does not require immediately into a dedicated prefetch buffer, but which are anticipated to be required in the near future. Such data is typically used only once or will not be reused in the immediate future, and is termed "non-temporal data". Instructions that load or prefetch data stored in the cache which the processor uses frequently, are termed "temporal data".

Non-temporal write instructions or stores typically utilize a write-combining technique which first combines stored data that is being accessed into groups and then sends the combined groups to the external bus. Such combining of the outgoing data increases utilization of the bus bandwidth, which subsequently increases the write throughput of the processor.

However, the implementation of such a write combining technique suffers from a number of drawbacks. First, the number of the write combining buffers is limited. Second, the buffers are used for both loads and stores. These limitations cause performance reduction in some situations.

Accordingly, there is a need in the technology for a write combining technique that provides efficient use of the write combining buffers.

SUMMARY OF THE INVENTION

The present invention discloses a method and apparatus method for efficient utilization of write-combining buffers for a sequence of non-temporal stores to scattered locations. The method comprises: converting the sequence of non-temporal stores to stores to intermediate buffers; and grouping the stores to intermediate buffers into consecutive non-temporal stores. The consecutive non-temporal stores correspond to adjacent memory locations in the write-combining buffers.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for efficient utilization of write-combining buffers using non-temporal (NT) stores. The limitations described in the background section cause performance reductions in some situations. One situation is related to scattering writes. Scattering writes refer to the situation where there are consecutive non-temporal stores to non-adjacent, or scattered, memory locations. Due to the limited number of buffers, some partially filled buffers have to be evicted in order to make room for new data. The frequent eviction of these buffers increases bus traffic, thereby decreasing system performance. Another situation is related to the mixing of stores and loads. In a sequence of code having several non-temporal stores intermixed statically or dynamically with loads, partially filled buffers have to be evicted in order to service the loads. In either of these situations, eviction of partially filled buffers reduces the write throughput and significantly impact overall performance.

The method of the invention utilizes an intermediate buffer to store data in adjacent memory locations. The intermediate buffer is subsequently drained and its contents are transferred to the write-combining buffers and stored in adjacent locations.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
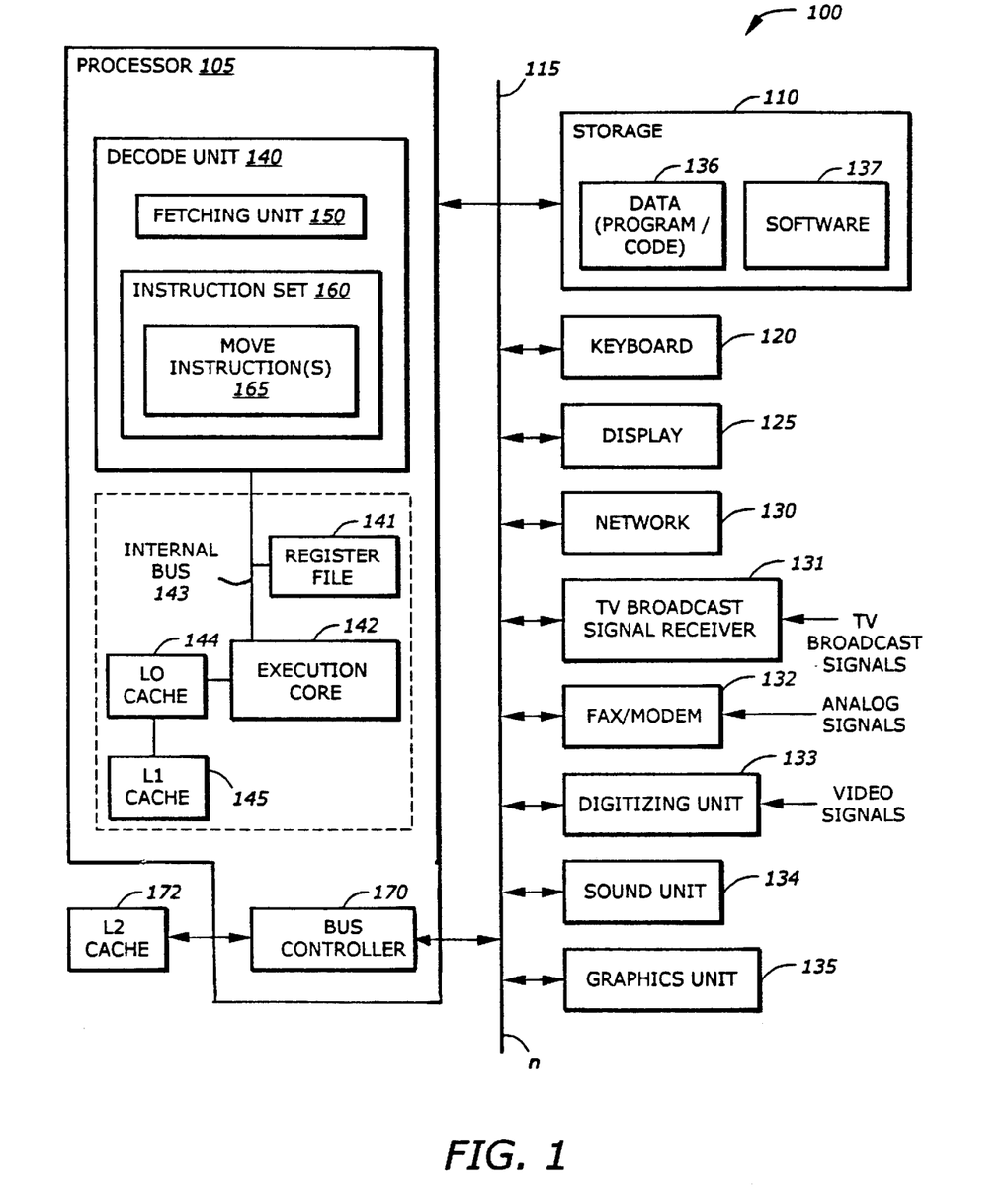
FIG. 1 is a diagram illustrating one embodiment of a computer system 100 which utilize the teachings of the present invention, according to one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. In addition, a number of user input/output devices, such as a keyboard 120 and a display 125, are also coupled to the bus 115. The processor 105 represents a central processing unit of any type of architecture, such as multi-threaded CISC, RISC, VLIW, or hybrid architecture. In addition, the processor 105 could be implemented on one or more chips. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic main memories, etc.). The graphics unit 135 represents one or more devices for generating 3-D images (e.g., graphics card). FIG. 1 also illustrates that the storage device 110 has stored therein data 136 and software 137. Data 136 represents data stored in one or more of the formats described herein. Software 137 represents the necessary code for performing any and/or all of the techniques described with reference to FIGS. 4–9. Of course, the storage device 110 preferably contains additional software (not shown), which is not necessary to understanding the invention.

FIG. 1 additionally illustrates that the processor 105 includes decode unit 140, a set of registers 141, an execution core 142, and an internal bus 143 for executing instructions. The processor 105 further includes two internal cache memories, a level 0 (L0) cache memory 144 which is coupled to the execution core 142, a level 1 (L1) cache memory 145, which is coupled to the L0 cache and a bus controller 170. An external cache memory, i.e., a level 2 (L2) cache memory 172, is coupled to bus 115 via the bus controller 170. The actual placement of the various cache memories is a design choice or may be dictated by the processor architecture. Thus, it is appreciated that the L1 cache could be placed external to the processor 105. In alternate embodiments, more or less levels of cache (other than L1 and L2) may be implemented.

Of course, the processor 105 contains additional circuitry, which is not necessary to understanding the invention. The decode unit 140, registers 141 and execution core 142 are coupled together by internal bus 143. The decode unit 140 is used for decoding instructions received by processor 105 into control signals and/or micro code entry points. In response to these control signals and/or micro code entry points, the execution core 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including a fetching unit 150 which fetches instructions, and an instruction set 160 for performing operations on data. In one embodiment, the instruction set 160 includes a move instruction(s) 165 provided in accordance with the present invention.

Figure 2:
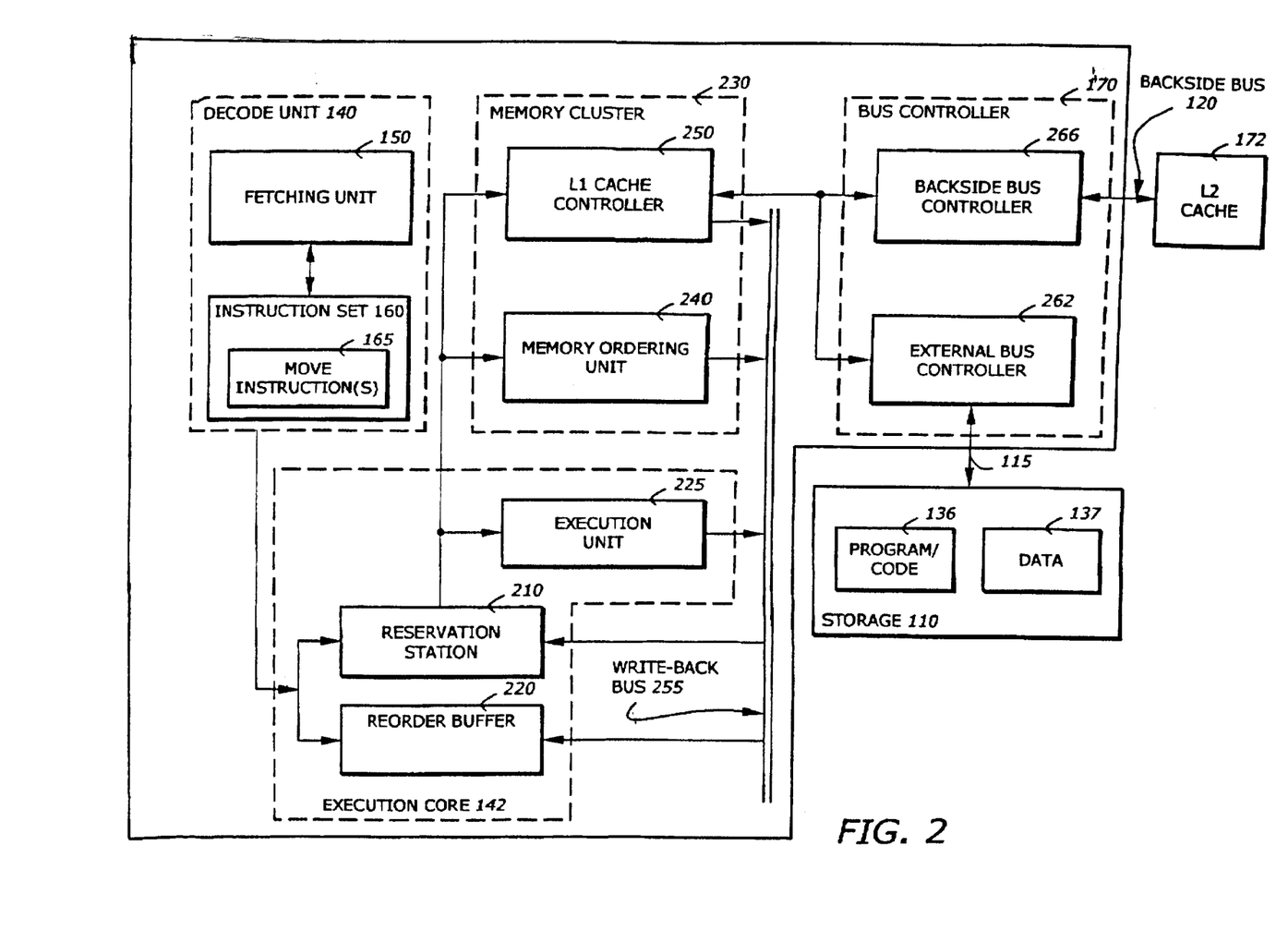
FIG. 2 is a detailed diagram of one aspect of the computer system 100 in accordance with the teachings of the present invention, according to one embodiment of the invention.

FIG. 2 is a detailed diagram of certain aspects of the computer system 100 according to one embodiment of invention. For simplicity, only elements useful in describing the invention are shown. As described earlier, the computer system 100 includes the processor 105, a bus controller 170, the L2 cache 172, the processor bus 115, and the storage device 110.

The processor 105 includes the decode unit 140, the execution core 142 (which includes, for example a reservation station 210, a re-order buffer 220, and an execution unit 225; of course, an in-order or different out-of-order architecture may be used), a memory cluster 230, and a write-back data bus 255. The memory cluster 230 further includes a memory ordering unit 240 and an L1 cache controller 250.

Upon receipt of an instruction, the decode unit 140 first decodes the instruction. The decode unit 140 then issues the decoded instructions to the execution core 142. If the instruction is a memory-referencing instruction, it will be dispatched to the memory ordering unit 240 which accesses the L1 cache via the L1 cache controller 250.

The write-back bus 255 provides the data path for the L1 cache controller 250 or the execution core 142 to return the data back to the re-order buffer 220 and the reservation station 210.

The bus controller 170 provides an interface between the processor 105 and the L2 cache 172 via bus 115. The bus controller 170 includes an external bus controller 262 and a backside bus controller 266. The external bus controller 262 provides the interface between the L2 cache 172 and the bus 115 (to which the external storage 110 is connected). The backside bus controller 266 provides an interface between the L2 cache 172 and the bus 115.

Figure 3:
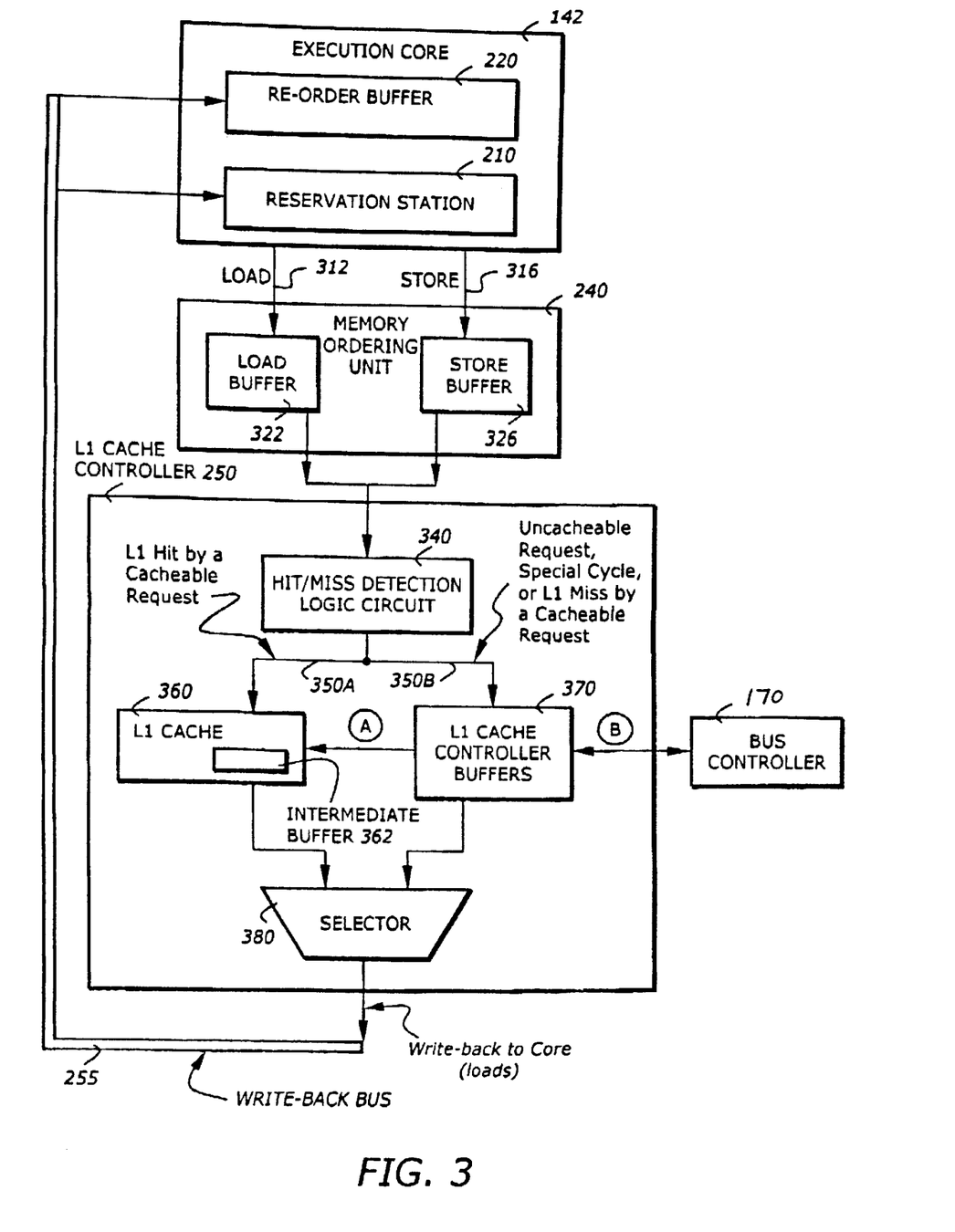
FIG. 3 is a diagram illustrating the relationship and data paths between the execution core 142 and various memory control elements, according to one embodiment of the invention.

FIG. 3 is a diagram illustrating the relationship and data paths between the execution core 142 and various memory control elements. It is assumed that the decoded instructions are memory-referencing instructions.

As shown in FIG. 3, the execution core 142 dispatches the instruction to the memory ordering unit 240 via the Load Bus 312 or the Store Bus 316 if the instruction is a load or store instruction, respectively. The memory ordering unit 240 includes a load buffer unit 322 and a store buffer unit 326. The load buffer unit 322 receives the load instructions via the load bus 312. The store buffer unit 326 receives the store instructions via the store bus 316.

Instructions in the load buffer unit 322 and store buffer unit 326 are dispatched to the L1 cache controller 250. The L1 cache controller 250 includes a hit/miss detection logic circuit 340, an L1 cache 360, an L1 cache controller buffer 370, and a write-back selector 380. The hit/miss detection logic circuit 340 detects if either the load or store instruction is a cacheable request. If the instruction is a cacheable request and has a L1 hit, the cache access is provided via a bus 350A to the L1 cache 360. If the instruction is an uncacheable request, a special cycle, or cacheable request with a L1 miss, the request is routed to the L1 cache controller buffer 370 via a bus 350B. For a cacheable request with a L1 miss, the missing data is transferred to the L1 cache 360 from the L1 cache controller buffer unit 370 via path A. This data typically comes from the L2 cache or the external memory.

The bus controller 170 services the requests from the L1 cache controller buffer 370 via path B. For cacheable request misses or uncacheable loads, the data flow is from the bus controller 170 to the L1 cache controller buffer 370. For uncacheable stores or writes, the data flow is from the L1 cache controller buffer 370 to the bus controller 170.

For loads, data are written back to the execution core 142. The write-back data may come from the L1 cache 360 (for cache hits) or the L1 cache controller buffer 370 (for cacheable misses or uncacheable loads). The selector 380 switches between these two write-back sources to the write-back bus 255. The write-back data are then written to the re-order buffer in the execution core 142 and the write-back data valid bit, or other status/control information, is written to the reservation station in the execution core 142.

USE OF INTERMEDIATE BUFFERS

Figure 4:
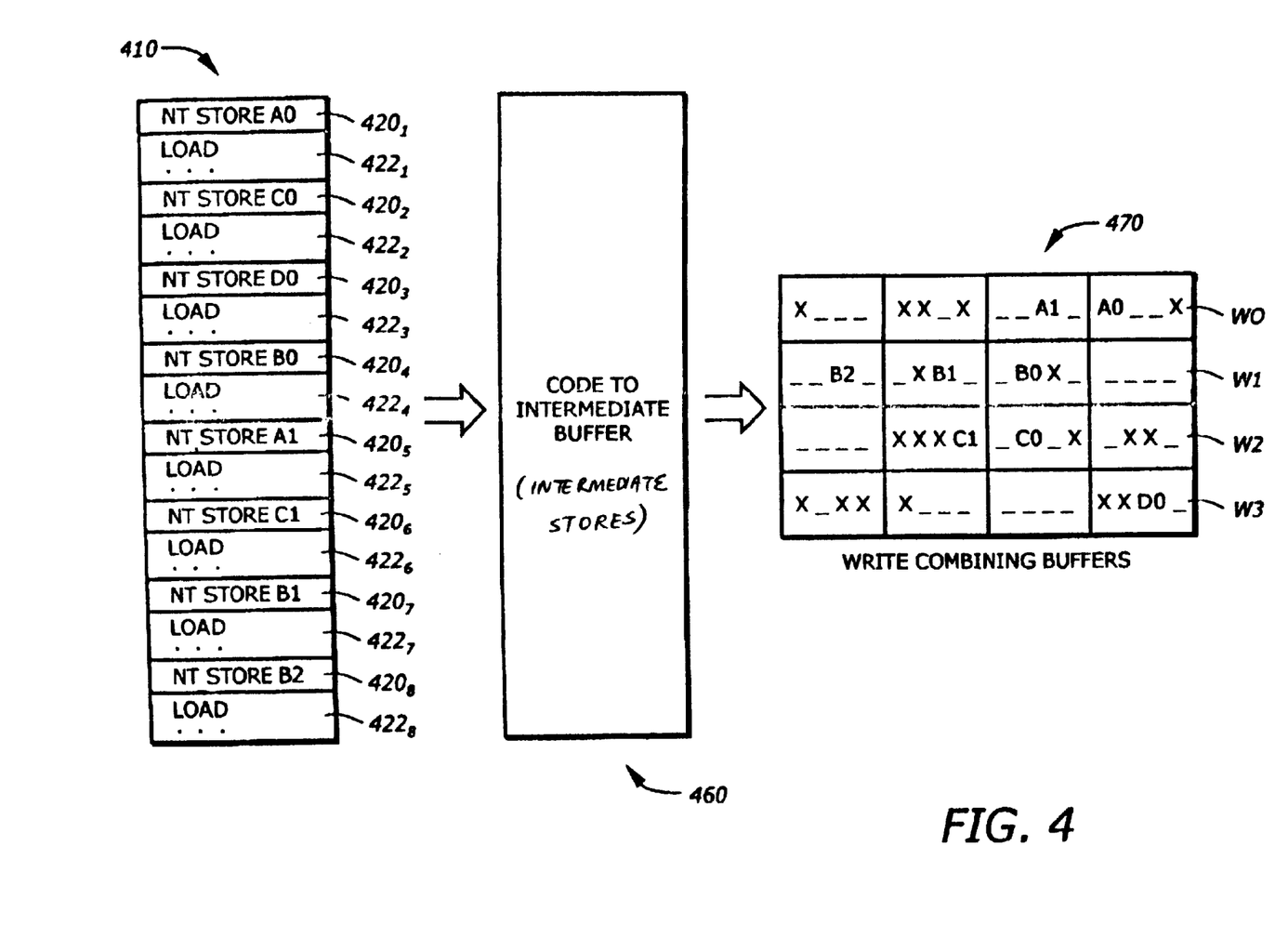
FIG. 4 is a diagram illustrating a sequence of non-temporal stores 410 and a sequence of intermediate stores 460 that are used in conjunction with the write-combining buffer unit 410, according to one embodiment of the invention.

FIG. 4 is a diagram illustrating a sequence of non-temporal stores 410 and a sequence of intermediate stores 460 that are used in conjunction with the write-combining (WC) buffer unit 470 according to one embodiment of the invention. The non-temporal stores 410 and intermediate stores 460 are stored as program or code in storage 110 (FIG. 1) or in L1 cache 360 (FIG. 3) In alternate embodiments, the non-temporal stores 410 and intermediate stores 460 may be stored in L0 cache 144 or L2 cache 172. In one embodiment, the sequence 410 represents scattering writes. The consecutive non-temporal stores $420_{1-N}$ in the sequence 410, write to non-adjacent addresses in various buffer locations in the WC buffer unit 470. In one embodiment, the WC buffer unit 470 is represented by the L1 cache controller buffers 370.

The sequence 410 includes a number of non-temporal (NT) stores $420_{1-N}$, that are intermixed with loads and other instructions $422_{1-M}$. In the example of FIG. 4, N=8 and M=8. The intermediate stores 460 transform each non-adjacent NT store $420_{1-N}$ to a cacheable store and an adjacent NT store, as described in detail in the following sections.

The WC buffer unit 470 includes four fill buffers: buffers W0, W1, W2, and W3. In one embodiment, each buffer W0, W1, W2 and W3 has four storage locations each being 8 bytes wide. In alternate embodiments, a greater or lesser number of storage locations may be implemented. In addition, in alternate embodiments, each storage location may accommodate fewer or a greater number of bytes. In one embodiment, the four fill buffers W0, W1, W2, and W3 are located in the L1 cache controller buffers 370. As shown in FIG. 4, the buffers W0–3 are partially filled, where a "-" represents non-valid data, an "x" represents valid data, and A0, A1, B0, B1, B2, C0, C1, and D0 represent valid data.

The intermediate stores 460 write non-adjacent data A0, C0, D0, B0, A1, C1, B1, and B2, respectively, to the buffers W0, W1, W2, and W3. In the example shown in FIG. 4, A0 and A1 are written to the buffer W0; B0, B1, and B2 are written to the buffer W1; C0 and C1 are written to the buffer W2; and D0 is written to the buffer W3.

Figure 5:
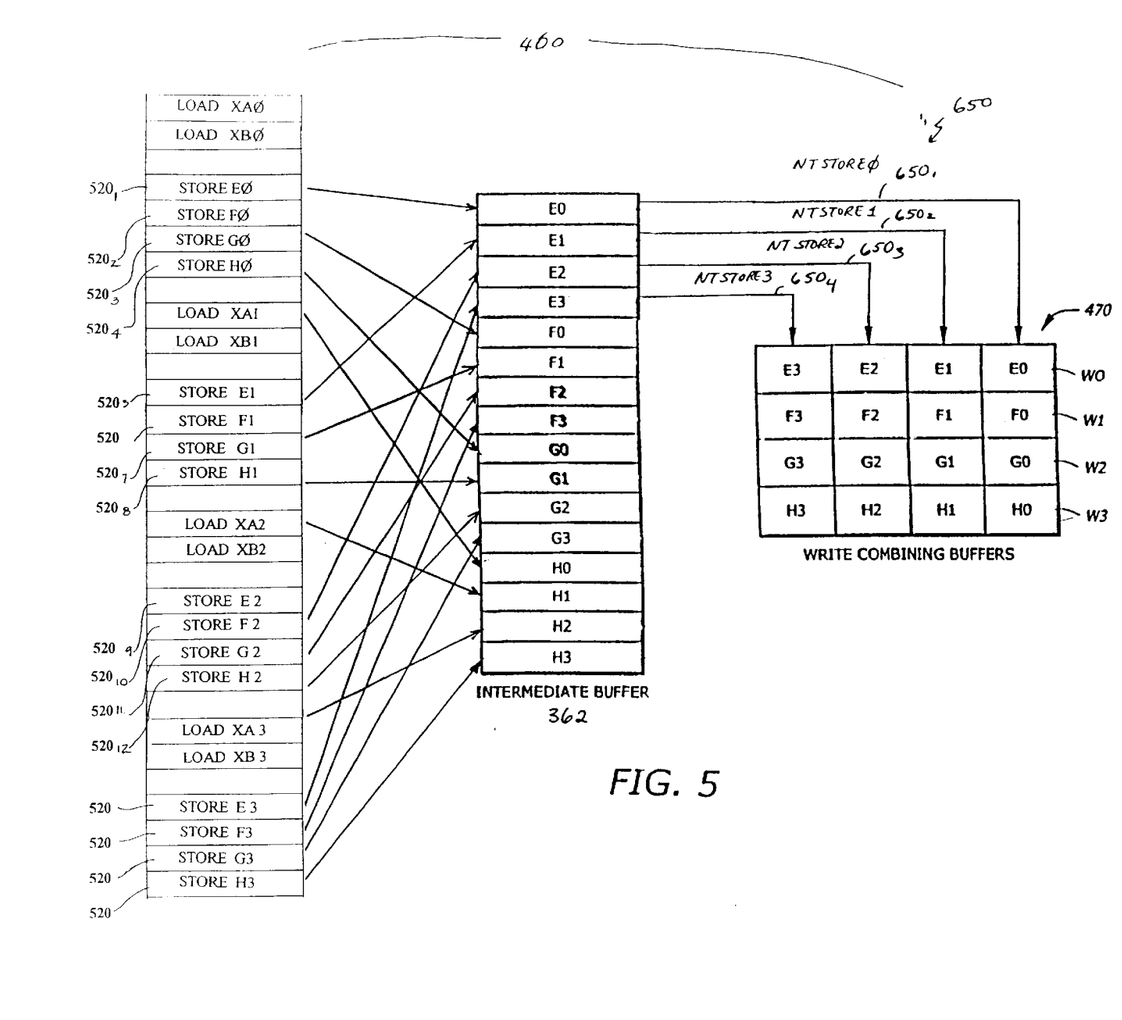
FIG. 5 is a diagram illustrating details of the intermediate stores 460 of FIG. 4, according to one embodiment of the invention.

FIG. 5 is a diagram illustrating details of the intermediate stores 460 of FIG. 4, according to one embodiment of the invention. In one embodiment as shown, the intermediate stores 460 includes two code sequences 520 and 650.

The code sequence 520 gathers the non-adjacent stored data in an intermediate, software-allocated buffer in cacheable memory such as the intermediate buffer 362 (FIG. 3). The intermediate buffer 362 contains E0–E3, F0–F3, G0–G3, H0–H3.

The code sequence 650 essentially drains the intermediate buffer 362 and dispatches the data to the buffers W0, W1, W2 and W3 via bus 255 using back-to-back non-temporal stores (NT STORE0, NT STORE1, NT STORE2, NT STORE3) $650_{1-4}$. The grouping of these non-temporal stores (NT STORE0, NT STORE1, NT STORE2, NT STORE3) is based on the adjacency of the buffer locations as shown in FIG. 4. By grouping these NT stores based on their adjacent data addresses, the frequency of eviction of the fill buffers W0, W1, W2 and W3 is significantly reduced, resulting in high write throughput and better overall performance.

As shown in FIG. 5, the intermediate buffer 362 contains all the data stored in proper consecutive locations. When adjacent NT store code sequence $650_{1-4}$ operates on the intermediate buffer 362 to drain the data from the intermediate buffer 362, the data at consecutive addresses are transferred to the WC buffers 470. For example, data at consecutive locations E0, E1, E2 and E3 are transferred to the same buffer, W0, data at consecutive locations F0, F1, F2 and F3 are transferred to the same buffer, W1; data at consecutive locations G0, G1, G2 and G3 are transferred to the same buffer, W2 and data at consecutive locations H0, H1, H2 and H3 are transferred to the same buffer, W3. Since data from adjacent locations in a single group are transferred from the intermediate buffer 362 to the same buffer (e.g., any one of W0, W1, W2 or W3), the expensive partial WC eviction can be completely removed and the transfer of data can be performed at a much faster rate.

Figure 6A:
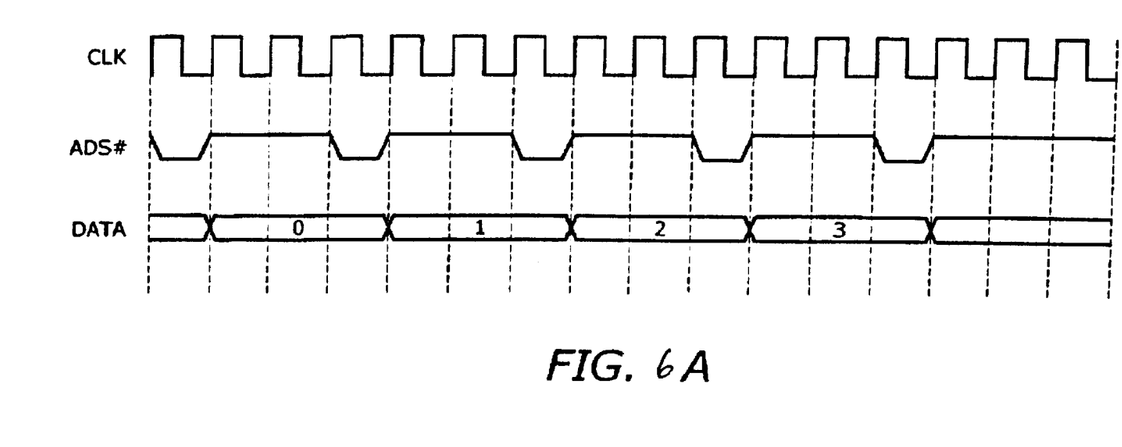
FIG. 6A is a timing diagram illustrating a typical example of the data transfer without the use of the write combining technique of the present invention, according to one embodiment of the invention.

FIG. 6A is a timing diagram illustrating a typical example of the data transfer without the use of the write combining technique of the present invention. The clock (CLK) refers to the bus clock. The Address Strobe (ADS#) is the signal to indicate that the address is valid. The DATA shows the chunk as transferred over the bus. As shown in FIG. 6A, the data transfer occurs at a rate of 3 clock cycles per chunk, or 12 clocks to transfer 1 cache line. The effective bandwidth is approximately 266 MB/sec.

Figure 6B:
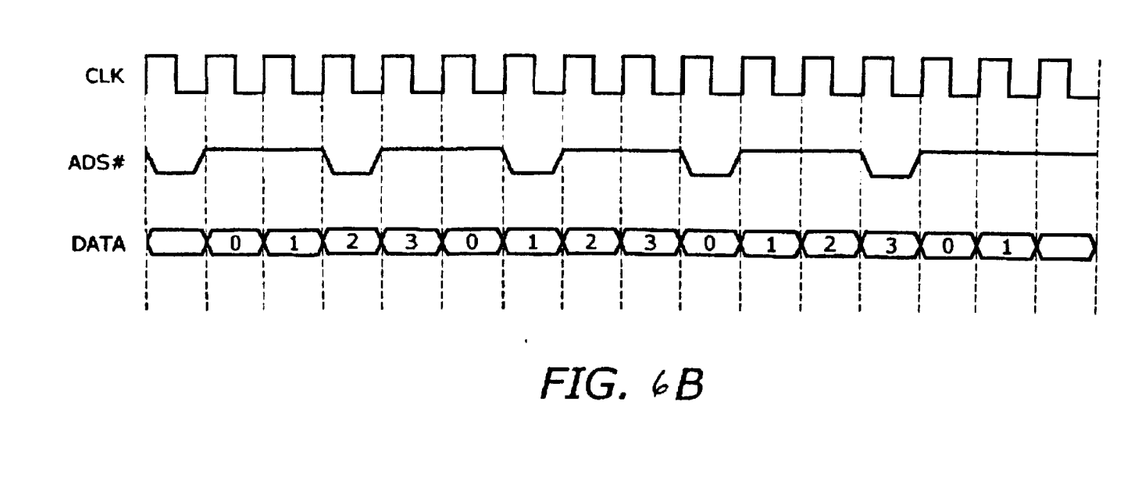
FIG. 6B is a timing diagram of the data transfer with the use of the write combining technique of the present invention, according to one embodiment of the invention.

FIG. 6B is a timing diagram of the data transfer with the use of the write combining technique of the present invention. Now, since the data transfers are for adjacent locations, each chunk of instructions can be transferred in one clock cycle, resulting in an improvement of 3 times in transfer rate. The effective bandwidth is approximately 800 MB/s at a rate of 4 clocks for each cache line.

Figure 7:
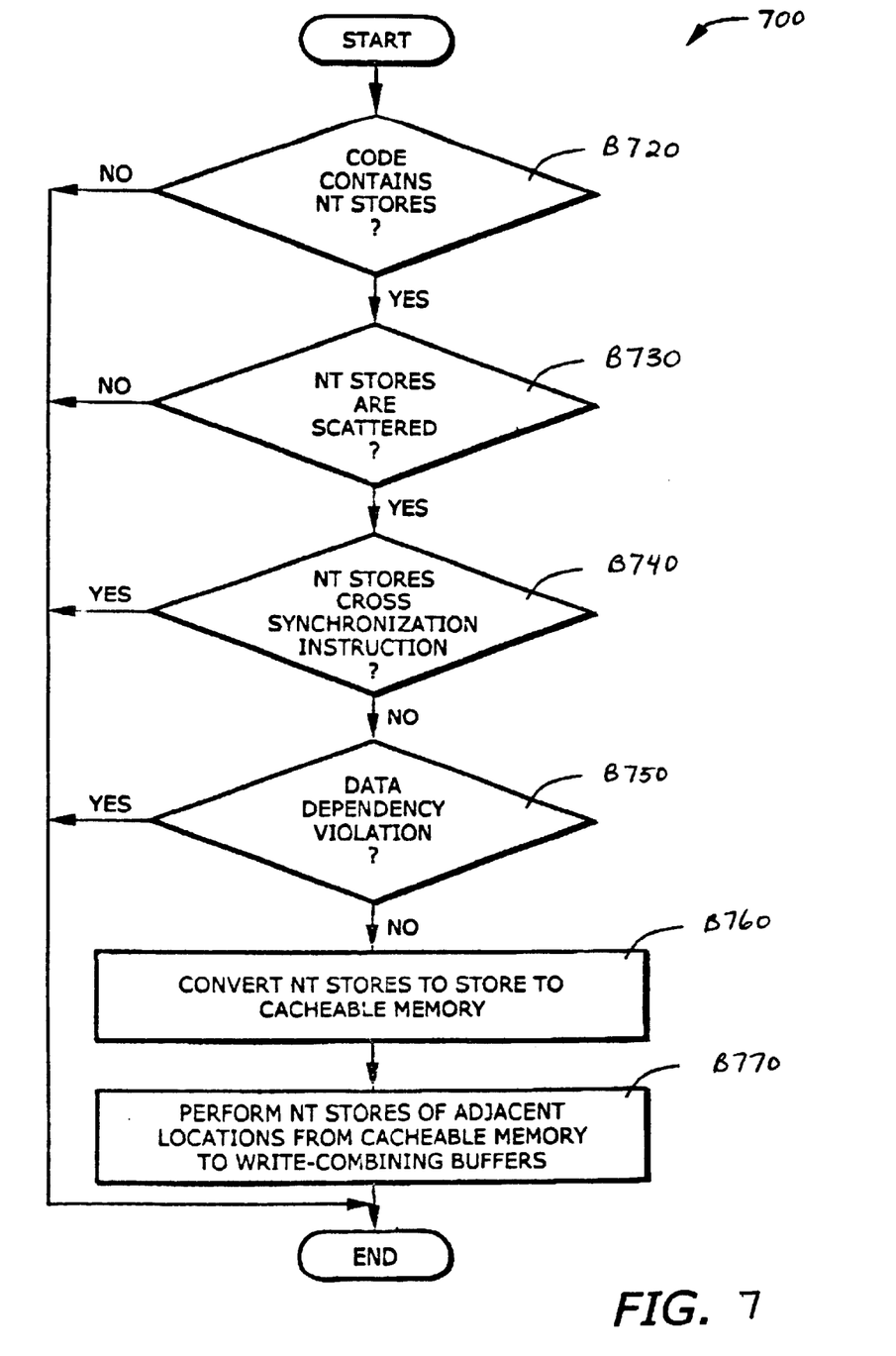
FIG. 7 is a flowchart illustrating the write combining process 700 according to one embodiment of the present invention.

FIG. 7 is a flowchart illustrating the write combining process 700 of the present invention. Beginning from a START state, the process 700 proceeds to process block B720 to determine if the instructions received by the reservation station 210 include NT stores. If not, the process 700 is terminated. If the instructions include NT stores, the process 700 advances to process block B730 to determine if the NT stores are scattered writes. If not, the process 700 is terminated since the processing of non-scattered writes typically will not result in performance degradation. However, in an alternate embodiment, the invention may be applied to non-scattered writes. If the instructions include scattered writes, the process 700 proceeds to process block B740 to determine if the NT stores cross any synchronization instruction. A synchronization instruction, e.g., a STORE FENCE instruction, forces the eviction of the fill buffers W0, W1, W2 or W3 so that the data is globally observable. If there is a synchronization instruction, the grouping of the NT stores may not be effective; therefore, the process 700 is terminated.

If there is no synchronization instruction, the process 700 advances to process block B750 to determine if any data dependency is violated due to the re-arrangement of the NT stores. If so, the process 700 is terminated. Otherwise, the process 700 proceeds with the transfer of data associated with the NT stores, to the software allocated intermediate buffers 362 as shown in process blocks B760 and B770. In particular, the process 700 proceeds to process block B760 to convert all the NT stores to explicit stores to cacheable memory such as the intermediate cacheable buffer 362. Then, the process 700 advances to block B770 to perform NT stores of adjacent locations from the intermediate buffer 362 in cacheable memory to the write-combining buffers 470. The process 700 then terminates.

Figure 8:
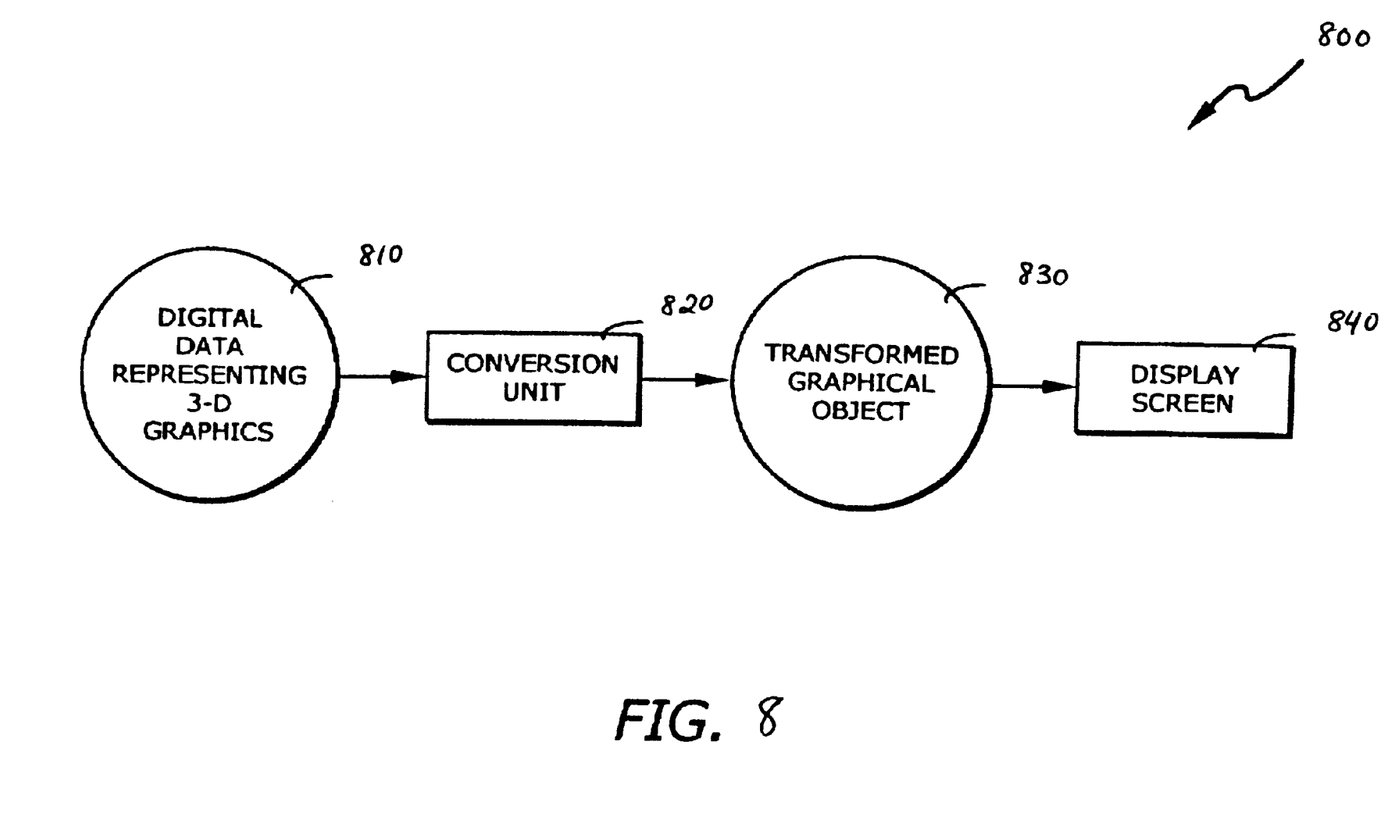
FIG. 8 is a general block diagram illustrating the use of the write combining process of the invention for rendering graphical objects in animation according to one embodiment of the invention.

FIG. 8 is a general block diagram illustrating the use of the write combining process of the invention for rendering graphical objects in animation according to one embodiment of the invention. FIG. 8 shows a computer system 800 containing digital data 810 representing 3-dimensional (3D) graphics. The digital data 810 may be stored on a CD ROM or other type of storage device for later use. At sometime, the conversion unit 820 performs alteration of data using 3D geometry which includes the use of the write combining technique of the invention to process non-temporal data so as to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the 3D graphics operation 800 from FIG. 8. In this embodiment, the digital data 810 from FIG. 8 is any data stored in the storage device 110 representing 3D graphics. In one embodiment, the conversion unit 820 from FIG. 8 is implemented using the processor 105 and the software 137 to alter data using 3D geometry. An example of such alteration of data includes the performance of a 3D transformation. In this embodiment, the processor 105, executing the software 137, performs the transformation and stores the transformed data 830 in the storage device 110 and/or provide, the transformed data to the graphics unit (not shown). In this manner, the 3D manipulation performed by the host processor of the computer system is provided at an increased speed.

The invention therefore provides a method for efficiently utilizing the write-combining buffers through the implementation of non-temporal stores and intermediate buffers. The write combining method of the invention reduces the frequency of buffer evictions, thus improving the write throughput and overall system performance.

Figure 9A:
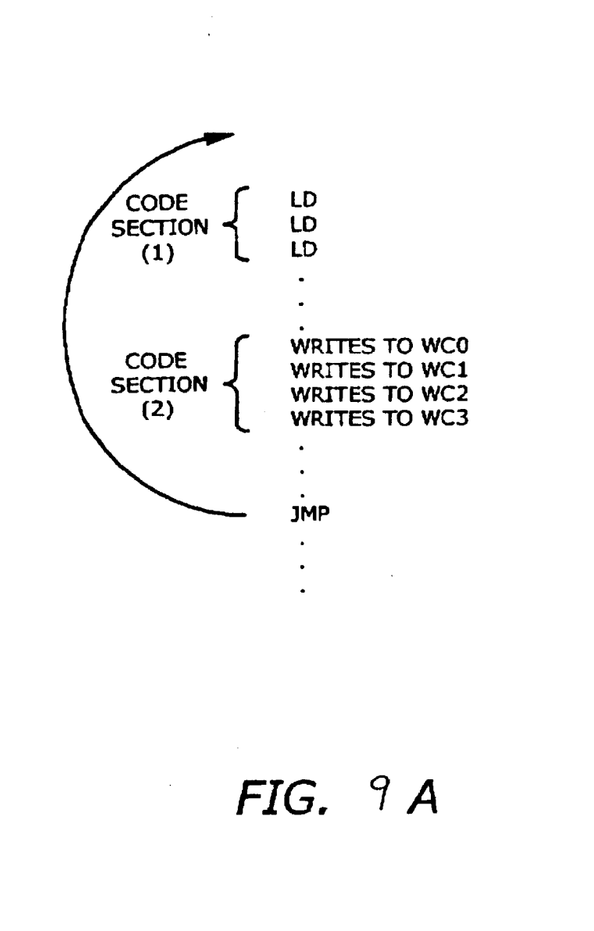
FIG. 9A illustrates a program section prior to implementation of the invention.
Figure 9B:
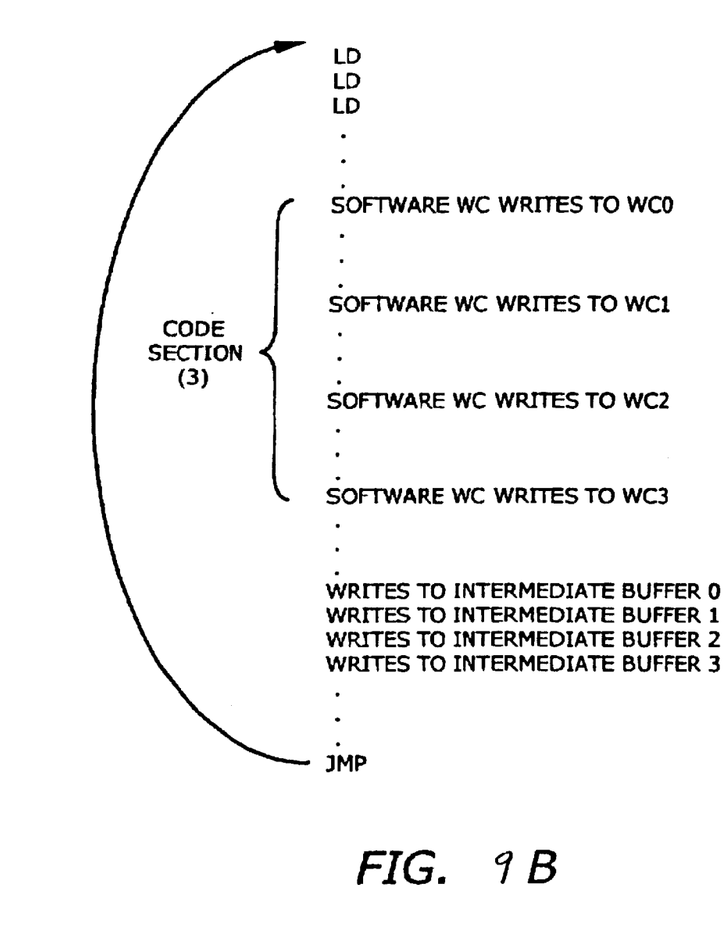
FIG. 9B illustrates a program section that implements one embodiment of the invention.

In addition, through the application of the invention, flexible scheduling of NT stores or writes is possible. Prior to implementation of the invention, the newly generated data (resulting from execution of the NT stores) has to be immediately inserted into the write combine (WC) memory or buffer. Through the use of the invention, an intermediate buffer is used to save the newly generated data in a temporary location. As a result, actual writes to the WC memory can be redirected as rescheduled to a point within a program or code that has the least memory traffic. For example, we can scatter the software WC writes across the execution sequence to balance the memory pipeline, as shown in FIGS. 9A and 9B. In FIG. 9A, code sections (1) and (2) are memory hot spots (heavy traffic areas). By implementing the invention, as represented by code section (3)(FIG. 9B), memory accesses are distributed evenly across the loop. As a result, the write throughput and overall system performance is increased.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    converting a sequence of non-temporal stores of data to scattered locations to stores to intermediate buffers; and
    grouping the stores to intermediate buffers into consecutive non-temporal stores in a write-combining (WC) buffer unit based on location adjacency, the WC buffer unit having multiple WC buffers to store data, the WC buffers being separate from the intermediate buffers.

2. The method of claim 1, wherein the intermediate buffers are located in cache memory.

3. The method of claim 1, wherein the non-temporal stores include move instructions.

4. The method of claim 1, wherein said data is packed floating point data.

5. The method of claim 1, wherein said data is packed integer data.

6. A computer system comprising:
    a hardware unit to transmit data representing graphics to another computer or a display;
    a processor coupled to the hardware unit; and
    a storage device coupled to the processor and having stored therein a routine, which when executing by the processor, causes the processor to generate said data, said routine at least causing said processor to at least,
        convert a sequence of non-temporal stores to scattered locations to stores to intermediate buffers; and
        group the stores to intermediate buffers into consecutive non-temporal stores in a write-combining (WC) buffer unit based on location adjacency, the WC buffer unit having multiple WC buffers to store data, the WC buffers being separate from the intermediate buffers.

7. The computer system of claim 6, further comprising a cache memory, wherein the intermediate buffers are located in the cache memory.

8. The computer system of claim 6, wherein the non-temporal stores include move instructions.

9. The computer system of claim 6, wherein said data is packed floating point data.

10. The computer system of claim 6, wherein said data is packed integer data.

11. A method comprising:

accessing data representative of a first graphical object;

altering said data using geometrical transformation to generate a second graphical object, said step of altering at least including, converting a sequence of non-temporal stores to scattered locations to stores to intermediate buffers; and grouping the stores to intermediate buffers into consecutive non-temporal stores in a write-combining (WC) buffer unit based on location adjacency, the WC buffer unit having multiple WC buffers to store data, the WC buffers, the write-combining buffers being separate from the intermediate buffers.

12. The method of claim 11, wherein altering said data includes the performance of three-dimensional transformation.

13. The method of claim 11, wherein said first and said second graphical objects are three-dimensional objects.

14. The method of claim 11, wherein the intermediate buffers are located in cache memory.

15. The method of claim 11, wherein the non-temporal stores include move instructions.

16. The method of claim 11, wherein said data is packed floating point data.

17. The method of claim 11, wherein said data is packed integer data.

* * * * *

UNITED STATES PATENT AND TRADEMARK OFFICE
CERTIFICATE OF CORRECTION

PATENT NO.   : 6,356,270 B2                                            Page 1 of 1
DATED        : March 12, 2000
INVENTOR(S)  : Pentovski et al.

It is certified that error appears in the above-identified patent and that said Letters Patent is hereby corrected as shown below:

<u>Drawings,</u>
Sheet 5, Figure 5, above code sequence 520 insert the legend -- 520 --.
Sheet 5, Figure 5, at Store F1, delete "520" and insert -- $520_6$ --.
Sheet 5, Figure 5, at Store E3, delete "520" and insert -- $520_{13}$ --.
Sheet 5, Figure 5, at Store F3, delete "520" and insert -- $520_{14}$ --.
Sheet 5, Figure 5, at Store G3, delete "520" and insert -- $520_{15}$ --.
Sheet 5, Figure 5, at Store H3, delete "520" and insert -- $520_{16}$ --.

Signed and Sealed this

Twelfth Day of November, 2002

*Attest:*

JAMES E. ROGAN
*Attesting Officer*    *Director of the United States Patent and Trademark Office*